Dec. 24, 1968  H. A. DUDLER  3,418,547
STEP-SERVOCONTROLLER
Filed March 22, 1965  4 Sheets-Sheet 1

INVENTOR.
HANS A. DUDLER
BY
Kenway, Jenney + Hildreth
ATTORNEYS

Dec. 24, 1968  H. A. DUDLER  3,418,547
STEP-SERVOCONTROLLER
Filed March 22, 1965  4 Sheets-Sheet 3

INVENTOR.
HANS A. DUDLER
BY
*Kenway, Jenney + Hildreth*
ATTORNEYS

Dec. 24, 1968   H. A. DUDLER   3,418,547
STEP-SERVOCONTROLLER
Filed March 22, 1965   4 Sheets-Sheet 4

INVENTOR.
HANS A. DUDLER
BY
Kenway, Jenney + Hildreth
ATTORNEYS

United States Patent Office 3,418,547
Patented Dec. 24, 1968

3,418,547
STEP-SERVOCONTROLLER
Hans A. Dudler, Wellesley Hills, Mass., assignor to General Signal Corporation, a corporation of New Jersey
Filed Mar. 22, 1965, Ser. No. 441,473
12 Claims. (Cl. 318—18)

ABSTRACT OF THE DISCLOSURE

Apparatus for driving a stepper motor from a pulse train and utilizing a closed loop system incorporating the driving apparatus and the stepper motor. The stepper motor drive includes a conventional binary counter which is reversible in its direction of count and a converter for converting the output of the binary counter to a so-called cyclic code. Appropriate output signals from the counter are supplied to the two orthogonally disposed windings of the stepper motor to cause its output shaft to step in one direction or the other in accordance with the signals supplied from the counter. In the closed loop system described the rate of pulses supplied to the motor is varied in accordance with the difference between a command signal indicating desired motor shaft position and a feedback signal indicating actual motor shaft position.

---

This invention deals with the control of a stepping motor, and particularly with control of the servo or "follow up" type. Its primary object is to cause the motor shaft, in response to signals representing its deviation from a desired angular position, to rotate in abrupt, short steps in a direction to reduce, and finally to eliminate, the deviation. A secondary object is to provide adjustability of the stepping rate; for large deviations, to a rate that is conformable with the use to which the stepping motor is put and, as the deviation is reduced by the stepping action, gradually to reduce the stepping rate so as to prevent an abrupt halt of the apparatus driven by the motor.

A stepping, stepper or, more simply, a "step" motor is one which, while it resembles an ordinary revolving motor in its construction and which, like the latter, relies for its action on electromagnetic induction, operates in a different mode. The magnetic field in the rotor space, instead of revolving continuously, is abruptly shifted in direction in a sequence of short steps. This is accomplished by the independent control of the currents flowing in two orthogonal stator windings. The angular position of the rotor follows the direction of this field, so that, between successive steps, the angular position of the shaft remains fixed. The step motor thus provides firm, forcible and precise control for the positioning of parts and subassemblies of machine tools, the valves of hydraulic apparatus, and the like.

In many circumstances it is required that an output shaft, with ample power behind it, exactly follow the position of an input shaft that has much less power behind it; indeed, the latter may be merely the extension of a knob that is turned by finger and thumb. In such circumstances a controller of the servo or "follow up" type is indicated.

The smaller the required shaft speed, the higher the required precision of the final shaft angle and the smaller the total required number of revolutions of the shaft, the more clearly a step motor is indicated for such uses. Accordingly, a more specific object of the invention is to develop from signals that are representative of the deviation, both in magnitude and in sense, between the angular position of the shaft of a step motor and that of a control index, two independent electric currents for energizing the two stator windings in such a way as to cause the magnetic field in the rotor space to undergo successive angular shifts in directions such as to reduce the deviation. For optimum performance the strength of the magnetic field should remain unaltered as its direction changes; and this requires that the current in each stator winding be reversed without substantial change of its magnitude. The angular shift of the magnetic field is accomplished by arranging that these reversals for each winding alternate with similar reversals for the other winding.

The invention accomplishes these objects in the following fashion. Voltages are derived from two potentiometers, one driven by the motor shaft and the other under external control, and the voltage difference is converted by a differential amplifier into two signals, one representing the magnitude of the deviation and the other representing its sense. The magnitude signal, advantageously limited to a moderate level, controls the frequency of a train of pulses delivered by a relaxation oscillator to a reversible modulo four pulse counter. The counter delivers, on its first and its second digit output terminals, two-valued electrical conditions that represent the first and second digits of a code counterpart of the number of pulses counted, arranged in the "cyclic permutation" or "reflected binary" code. In the usual case these two electrical conditions for each digit are converted into currents of equal magnitudes and opposite senses for delivery to the stator windings. In the special case of a counter constructed to present the two digit values for each digit as equal and opposite currents, the last conversion is of course unnecessary.

For a deviation of the shaft position from the desired one in one sense, counting is in one order. For a deviation in the other sense, the counting order must be reversed. Because reversal of the counting order is a simpler matter with a natural binary counter than with a cyclic permutation counter, the generation of the requisite stator currents is accomplished in two steps. First, pulses are counted in the natural binary code, in one order or in the opposite order, as called for by the signal which represents the sense of the deviation. Each two-digit output of the natural binary counter is then converted into its counterpart in the cyclic permutation code.

The invention will be fully apprehended from the following detailed description of an illustrative embodiment thereof taken in connection with the appended drawings in which FIG. 1 is a block schematic diagram showing apparatus embodying the invention;

Figure 1:
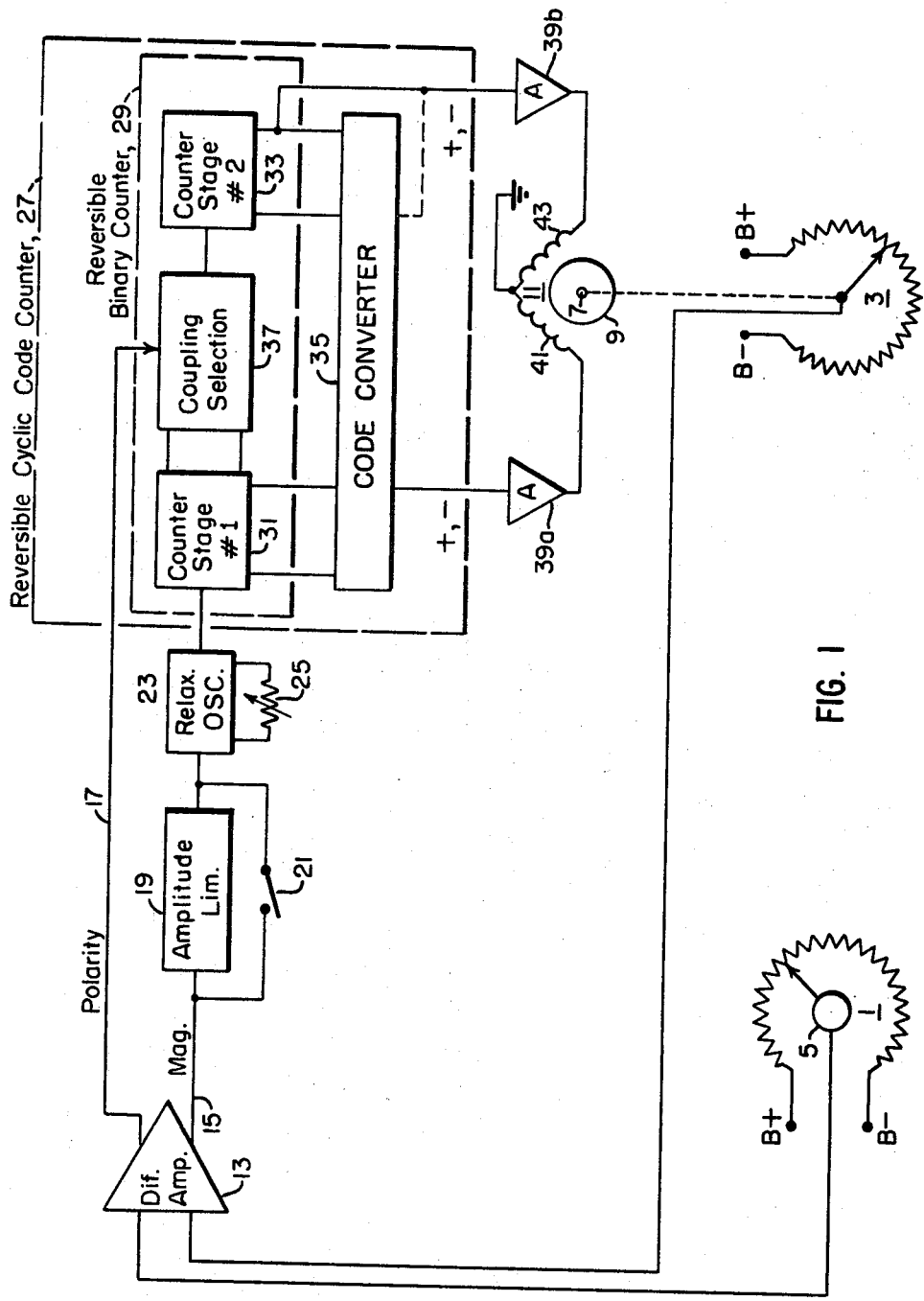

Referring now to the drawings, FIG. 1 shows two potentiometers 1, 3 connected between points of fixed potential designated B+ and B—. Although the wiper arm of the potentiometer 1 may be actuated by a mechanism, it is shown illustratively as arranged for actuation by hand as by turning a knob 5. The wiper arm of the potentiometer 3 is mechanically coupled to the shaft 7 of the rotor 9 of a stepper motor 11 so that it moves with the shaft and at all times follows its angular position. With the optional interposition of a conventional gear train, not shown, the movement of the wiper arm of the potentiometer 3 may be restricted to a single revolution or less, while the rotor 9 of the stepper motor 11 may make a number of revolutions.

The voltage supplied by the wiper of potentiometer 1 may be termed the "commond" voltage since it determines the position to which the shaft of the rotor 9 is to be driven, while the voltage from wiper of the potentiometer 3 may be termed the "feedback" voltage since it indicates the actual position of the shaft 7.

The voltages picked off from the resistors of the two potentiometers 1, 3 by their wiper arms are applied to the two input points of a differential amplifier 13. This amplifier, which will be described in detail below, is proportioned to deliver output signals of two kinds on two independent conductors 15, 17, the first indicating the magnitude of the difference between the potentiometer voltages, and the second indicating its polarity. For reasons that will appear below, the magnetic signal is advantageously limited in its amplitude to an intermediate or moderate level. This, however, is not essential and accordingly, if this feature is to be dispensed with, the limiter 19 may be bypassed by closure of a switch 21.

The magnitude-representing signal on the conductor 15, limited or not, is applied to a relaxation oscillator 23, which will be described in greater detail below. Provided the magnitude-representing signal exceeds a lower threshold, this relaxation oscillator 23 delivers a train of pulses of uniform amplitudes and controllable pulse rate. The pulse rate may be controlled by an external resistor 25, shown variable for the purpose. Advantageously, too, it may be controlled within limits to be described below by the magnitude-representing signal itself.

The pulse train output of the relaxation oscillator 23 is applied to the input point of a two stage binary counter 27. Like every other two-stage binary counter, the full set of its possible states restricts it to four counts; that is to say, after counting a sequence of four input pulses, it recycles and repeats. In other words, its counts may be denoted 0, 1, 2, 3–0, 1, 2, 3, and so on. Such counting is termed "modulo four." For the purposes of the invention the counter 27 must be reversible; that is to say that it must be able to count, too, in the order 0, 3, 2, 1–0, 3, 2, 1, and so on. Also, for the purposes of the invention, the electrical conditions which appear at its output points must be arranged in the "reflected" binary code described in F. Gray Patent No. 2,632,058, or, as it is sometimes termed, the "cyclic permutation" binary code. In the following description, this code will be designated, for short, the "cyclic" code.

While counters are known which deliver their outputs directly in the form of the cyclic code, introduction of the reversibility feature is sometimes awkward. To the contrary, the reversal of the count of a natural binary counter is a simple matter. Accordingly, the cyclic counter 27 is shown as consisting of two parts; the first part is a reversible binary counter 29 of two stages 31, 33, which counts in the natural binary code, while the second part is a converter 35 which converts the natural binary code output of the first part 29 into the cyclic binary code output required for actuation of the stepper motor 11. Following standard practice, reversal of the counting order is accomplished by alteration of the coupling between the two stages of the counter 29. Each stage of any such counter normally comprises a flip-flop constituted of a left-hand unit and a right-hand unit. Input pulses applied to both units together cause the counter to shift abruptly from any state in which it may have stood to the opposite state. This is for the reason that either the left-hand unit or the right-hand unit is normally insensitive to input pulses of a specified polarity, while the other unit is sensitive to them. The coupling from the first stage to the second stage normally extends either from the left-hand unit or from the right-hand unit of the first stage to both units of the second stage. When it extends from the right-hand unit, the counting takes place in one order. When it extends from the left-hand unit, the counting takes place in the opposite order. Accordingly, a coupling selector 37 is interposed between the first stage 31 and the second 33 and it acts, under control of the polarity signal on the conductor 17, to enable either the left-hand stage coupling path or the right-hand stage coupling path.

Every two-stage binary counter is provided with a first digit output terminal and a second digit output terminal. The two possible electrical conditions on these two terminals, taken together, make for a total of four different conditions, and each of these four conditions represents one of the four possible states of the counter as a whole, and hence one of the four possible counts. In addition to the principal first and second digit output terminals, it is sometimes, as in the present case, advantageously to provide each stage with an auxiliary output terminal on which appears an electrical condition which is the complement of the condition appearing on the principal terminal. Thus, for example, if the principal terminals are connected to the left-hand elements of the two stages 31, 33, the auxiliary terminals may be connected to their right-hand elements. It will be explained below how these auxiliary output terminals and the electrical conditions which appear on them are of advantage in the conversion of the natural binary code output of the counter 29 into a cyclic code suitable for application to the stepper motor 11.

The first digit output of the code converter 35 is applied by way of an amplifier 39a to one of the two orthogonally disposed windings of the stator of the stepper motor, i.e., to the winding 41. As will be shown in greater detail below, it turns out that conversion of the first digit output of the natural binary code counter 29 suffices for the purpose, the second digit output of the natural binary code counter being already in the form required. Accordingly, while in principle the entire natural binary code is converted, as a practical matter, its second digit need not be, and for this reason the path by which the second winding 43 of the stator of the stepper motor 11 is energized through an amplifier 39b is shown as extending directly from the second stage 33 of the natural binary code counter 29. To underscore the point of principle mentioned above, it is also shown in broken-line form as extending from the code converter 35 itself.

For proper step-by-step advance of the motor 11, it is required that each of the two orthogonally disposed stator windings 41, 43, be supplied first with a current in one sense, and then with a current in the opposite sense, and preferably of the same or nearly the same strength. Accordingly, the two electrical conditions applied to the two amplifiers 39a, 39b are designated on the drawing by the algebraic signs + and —. It is also required for proper operation of the stepper motor 11 that the reversals of the sense of the current in each winding be alternated with like reversals of a like current in the other winding. This alternation of conditions is inherent in the structure of the cyclic binary code and it is for this reason that this code is here employed.

The operation of the apparatus of FIG. 1 is as follows: given any deviation between the angular positions of the wiper arms of the potentiometers 1, 13, a difference exists between the voltages picked off by them. This difference, whatever it may be, is amplified by the differential amplifier 13. The amplifier delivers on its first output path 15, a signal representing the amplitude of the voltage difference applied to its input terminals and, on its second output path 17, a signal representing its polarity. Provided the first signal exceeds a first threshold, described below, it passes through the limiter 19 to the relaxation oscillator 23 which commences to operate, delivering pulses at a slow or moderate rate. As the voltage differential input to the differential amplifier 13 increases the first signal increases in strength and causes an increase in the pulse rate delivered by the relaxation oscillator 23. Advantageously, this increase in pulse rate is restricted to a comparatively small range of input voltage magnitudes and remains constant for greater input voltages. This feature is conveniently instrumented by inclusion of the limiter 19 which restricts the amplitude of the signal applied to the relaxation oscillator 23 to a level not greater than a second threshold. Accordingly, the pulse train output of the relaxation oscillator 23 remains of constant rate for all inputs of a preassigned magnitude corresponding to the second threshold or greater.

This constant pulse rate is in turn selected to suit particular purposes by adjustment of the rate control resistor 25 which forms a part of the relaxation oscillator circuit.

The pulses from the relaxation oscillator 23 are applied to the first stage 31 of the natural binary counter 29, and this first stage switches from one of its two possible states to the other for each such applied pulse. Each output pulse from the left-hand element or from the right-hand element of this first stage is applied through the coupling selector 37 as an input pulse to the second stage 33 which, accordingly, switches from one of its two possible states to the other for each output pulse of the first stage; i.e., for every other input pulse to the first stage. Whether the coupling from the first stage 31 to the second stage 33 extends from the left-hand element of the first stage or from its right-hand element is determined by the coupling selector 37 which is under control of the polarity signal on the conductor 17.

Conversion of the two-digit output of the natural binary counter 29 into the two-digit cyclic code in which, further, the electrical conditions are in the form of equal and opposite currents, is accomplished by the code converter 35 and these currents, after amplification by the amplifiers 39a, 39b, are delivered to the two stator windings 41, 43 of the stepper motor 11.

Figure 2:
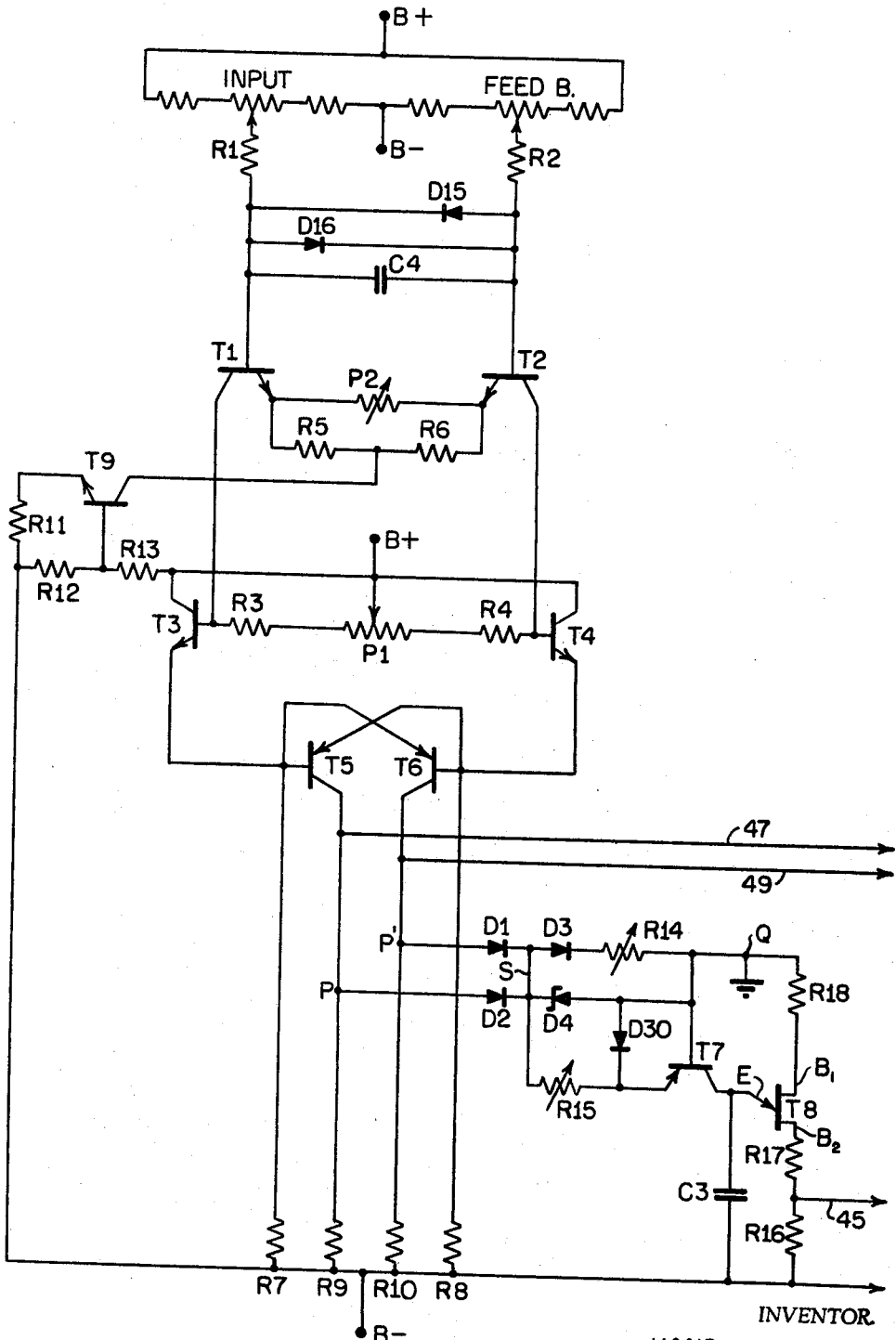
FIG. 2 is a schematic circuit diagram showing a differential amplifier and a relaxation oscillator.

FIG. 2 shows circuit details of the differential amplifier 13 and of the relaxation oscillator 23. The differential input from the two potentiometers 1, 3, is applied, through a protection filter described below, to the base electrodes of transistors $T_1$ and $T_2$, connected in the emitter-follower configuration for which the transistor $T_9$ serves as a current source. The gain of the transistor pair $T_1$, $T_2$ may be adjusted to a desired level by alteration of the magnitude of a resistor $P_2$ which interconnects the two emitters.

The collectors of the transistors $T_1$ and $T_2$ are connected directly to the base electrodes of transistors $T_3$ and $T_4$ and also to the two end terminals of a potentiometer $P_1$ and through its movable tap, to a source B+ of positive potential. The collectors of the transistors $T_3$ and $T_4$ are connected to the positive potential source B+, e.g., 17 volts. The potentiometer $P_1$ is included to adjust the balance of the amplifier as a whole, that is to say to absorb any spurious or accidental differences between the amplification factors of the two halves of the amplifier.

The emitter electrodes of the transistors $T_3$ and $T_4$ are directly connected to the base electrodes of transistors $T_5$ and $T_6$ and also through resistors $R_7$ and $R_8$ to a point B— of fixed negative potential, specifically —17 volts. In addition, a criss-cross connection extends from the base electrode of each of the transistors $T_5$ and $T_6$ to the emitter electrode of the other transistor. The collector electrodes of the transisors $T_5$ and $T_6$ are conneced to the negative source terminal B— through resistors $R_9$ and $R_{10}$. The criss-cross connection insures that any signal tending to drive one of the transistors $T_5$, $T_6$ into its conductive state tends equally to drive the other below its cut off.

With this amplifier, any voltage difference picked off the potentiometers 1, 3, by their wiper arms is reproduced as a voltage rise from —17 volts either of the resistor $R_9$ or the resistor $R_{10}$ but, because of the criss-cross connection, never both of these resistors together. When the input voltage difference is of sufficient magnitude, this voltage rise on $R_9$ or $R_{10}$ brings the potential of the upper end of that resistor from —17 volts to ground potential, whereupon operation of the relaxation oscillator 23 (FIG. 1) commences.

With readily available transistors of the double junction variety and with resistors of magnitudes as set forth in Table I below, the collector electrode of the transistor $T_5$ or $T_6$ rises from the potential of —17 volts to zero potential for an input voltage difference picked off the potentiometers 1, 3 of 4 or 5 millivolts.

Table I

|  | Ohms |
|---|---|
| $P_1$ | 75,000 |
| $P_2$, $R_5$, $R_6$ | 5,000 |
| $R_{12}$ | 10,000 |
| $R_{13}$ | 70,000 |
| $R_{11}$ | 20,000 |
| $R_7$, $R_8$, $R_9$, $R_{10}$ | 30,000 |

The resistors $R_1$, $R_2$ together with the diodes $D_{15}$ and $D_1$ constitute a circuit for protecting the amplifier against overload. The resistors $R_1$ and $R_2$ and the capacitor $C_4$ together constitute a low-pass filter for rejecting undesired high-frequency signals of any origin which might appear in the input to the amplifier.

The collector electrode of the transistor $T_5$ is connected at the point P by way of a diode $D_2$ to a point S, while the collector electrode of the transistor $T_6$ is similarly connected to the point P′ by way of a diode $D_1$ to the same point S. Accordingly, when a voltage appears at this point S, it is of the same polarity whether it be due to a rise of the collector voltage of the transistor $T_5$ or a like rise in the collector voltage of the transistor $T_6$. Thus the signal appearing at point S represents only the magnitude of the differential input voltage to the amplifier, its polarity being obscured.

The point S is connected by way of a Zener diode $D_4$, connected backward relatively to the diode $D_2$, to the base electrode of a transistor $T_7$. Accordingly, when a voltage at the point P, for example, has, in the course of its rise, reached a potential slightly above zero, the diode $D_2$ becomes conductive and the voltage is applied in the backward direction to the Zener diode $D_4$. This Zener diode $D_4$ fails to conduct, however, until the voltage at the point P has risen further to the breakdown point of the Zener diode, selected, in apparatus constructed in accordance with the invention, at 5.6 volts. Thus when the point P has risen from —17 to +5.6 volts, current passes the Zener diode $D_4$ in the backward direction and the Zener diode appears as a substantial short circuit, thus to inhibit further rise of the potential of the point P. A diode $D_{30}$ connected as shown, serves to protect the transistor $T_7$ from excessive base-emitter voltages.

For potentials of the point P between zero volts and 5.6 volts positive, the Zener diode $D_4$ behaves essentially as an open circuit. Under this condition, however, current flows from the point S through a diode $D_3$ and a variable resistor $R_{14}$ to ground. Furthermore, for any potential of the point P in excess of zero, current flows through a resistor $R_{15}$ to the emitter electrode of the transistor $T_7$, of which the base is connected to ground.

The collector of the transistor $T_7$ is connected to one terminal of a capacitor $C_3$ whose other terminal is connected to the negative source terminal B—. The transistor $T_7$ behaves as a source of essentially constant current through which the condenser $C_3$ is charged while the magnitude of this constant current, and hence the charging rate of the condenser $C_3$, is determined by the magnitude of the resistor $R_{15}$, the charging current being small for large ohmic values of the resistor $R_{15}$ and high for small values.

The upper terminal of the capacitor $C_3$ is connected to the emitter terminal of an avalanche breakdown transistor $T_8$, for example, one of the double base or unijunction type. One of the base electrodes of this unijunction transistor is connected by way of a resistor $R_{18}$ to ground and the other base electrode is connected by way of resistors $R_{16}$ and $R_{17}$ to the negative source terminal B—. This transistor $T_8$ is selected to break down and commence avalanche current flow from one of its base electrodes to the other when the potential of its emitter terminal has exceeded the potential of its lower base electrode by some 8 to 12 volts.

Operation takes place in the following fashion. As soon as the potential of the point P has risen from —17 volts to zero, charging of the capacitor $C_3$ through the transistor $T_7$ commences and takes place at a rate dependent on the magnitude of the resistor $R_{14}$. When the potential of the collector electrode of the transistor $T_7$ has risen, in the course of this charging operation, to the breakdown potential of the transistor $T_8$, the capacitor $C_3$ is abruptly discharged and the charging cycle recommences. Each such charge-discharge cycle generates an outgoing pulse on a conductor 45.

When the point P is at a somewhat higher potential, a somewhat larger current flows through the transistor $T_7$, the charging of the capacitor $C_3$ takes place at a somewhat greater rate, and the outgoing pulse repetition rate is somewhat faster. But increase of the charging current through the transistor $T_7$, and hence of the outgoing pulse repetition rate ceases when, by action of the Zener diode $D_4$, further rise in the potential of the point P is inhibited.

The train of outgoing pulses thus developed by the avalanche breakdown transistor $T_8$ is delivered by way of the conductor 45 to the input point of the first stage 31 of the binary counter 29 (FIG. 1). The amplitudes of the pulses are brought to a level suitable for positive stepping of the counter without overloading it by selection of the relative magnitudes of the resistors $R_{16}$ and $R_{17}$.

Figure 5:
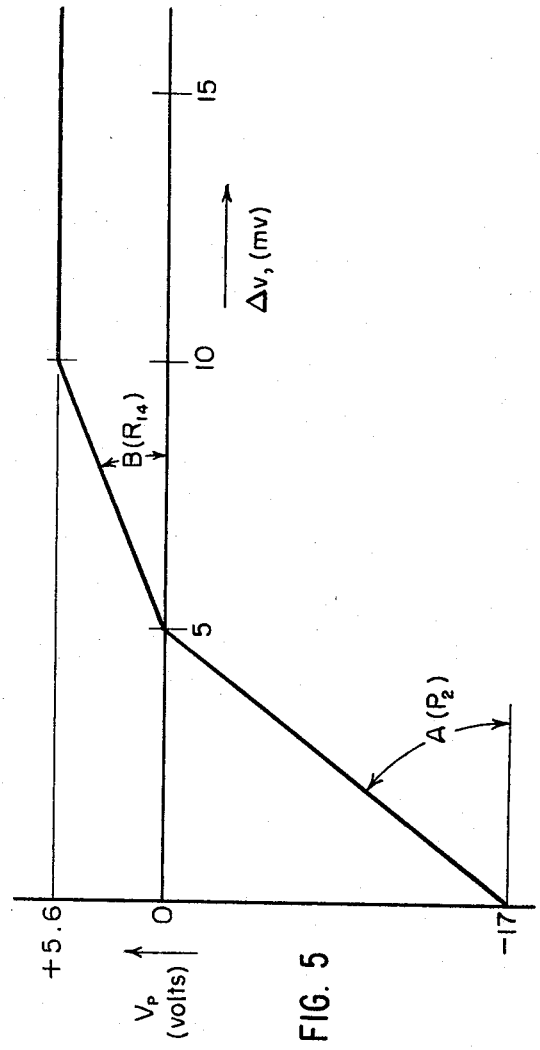
FIG. 5 is an input-output characteristic diagram of assistance in the explanation of the operation of FIG. 1.

The behavior described above is, of course, the same when it is the transistor $T_6$ which conducts so that the potential rise which makes for the operation of the relaxation oscillator is that of its collector instead of the collector of the transistor $T_5$, i.e., the potential of the point P'. The behavior is graphically illustrated on the curves of FIG. 5 wherein the abscissa represents the potentiometer voltage difference, designated $\Delta_v$, and the ordinate represents the voltage at the point P (or P'). Initially and with no input, the point P rests at —17 volts. For very small input voltages the potential of the point P rises at an angle A determined by the setting of the potentiometer $P_1$ until it reaches ground level or zero volts; thereupon, it rises at a less acute angle B determined by the magnitude of the resistor $R_{14}$ to a threshold of 5.6 volts, namely, the breakdown voltage of the Zener diode $D_4$. From there on, further rise of the potential of the point P is inhibited. The pulse rate, constant at a value determined by $R_{15}$ for input voltages in excess of about 10 millivolts, is also determined by the setting of the resistor $R_{14}$ which controls the angle B at which the second part of the curve of FIG. 5 rises from the lower threshold toward the upper one, the pulse rate increasing from a value of 1–2 pulses per second at the lower threshold to a much higher value, e.g., 10–20 pulses per second, at the upper threshold.

In operation, this variation of pulse rate appears not as an increase, but as a gradual reduction of the stepping rate of the motor as its deviation from its required angular position is gradually reduced in the course of its "homing." This offsets any possible tendency toward overshooting and avoids possible adverse effects that might interfere with the operation of the equipment controlled by the motor if it were to be brought too abruptly to a stop.

Two additional conductors 47, 49 extend, to the right on the drawing, from the points P and P'. The voltage which appears on one or other of these two conductors constitutes the polarity signal (on the conductor 17 of FIG. 1) which determines the order of counting.

Figure 3:
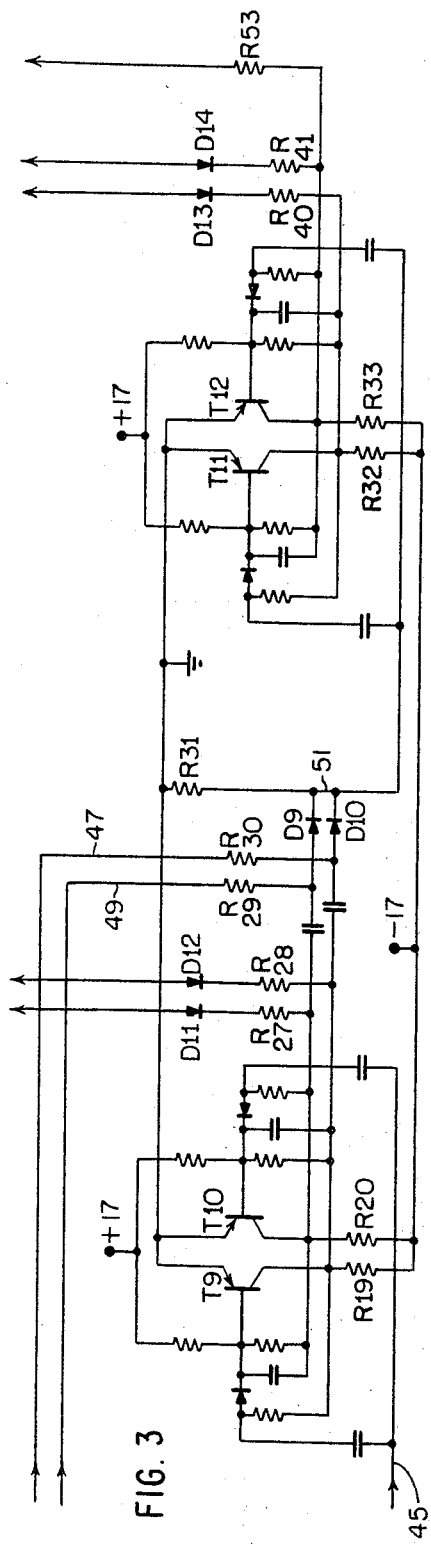
FIG. 3 is a schematic circuit diagram showing a reversible two-stage binary counter.

FIG. 3 shows the circuit details of a suitable reversible binary counter to which the pulse train developed by the relaxation oscillator are applied over the conductor 45. Largely conventional, each stage comprises a two-transistor flip-flop. In each case the transistors are of the PNP variety, and the emitters are all connected directly to ground. The collectors are connected to the negative potential bus through load resistors $R_{19}$ and $R_{20}$ in the first stage and $R_{32}$ and $R_{33}$ in the second stage. Thus, when a transistor is cut off, its collector rests at —17 volts while, when it is conducting or ON, its collector rises substantially to zero volts. As either flip-flop changes state, the transition is in each case very abrupt. The collector of each transistor of the first stage is connected, by way of a capacitor and a diode, to the input terminal 51 of the second stage. The anode of the diode $D_9$ is connected by way of the conductor 49 to the collector of $T_6$ (FIG. 2), while the anode of $D_{10}$ is similarly connected by way of the conductor 47 to the collector of $T_5$. Thus, rise of the potential of the collector of $T_5$ to zero or above enables the diode $D_{10}$, while a like rise of the potential of the collector of $T_6$ enables the diode $D_9$. Thus, either the left-hand transistor $T_9$ of the first stage flip-flop or its right-hand transistor $T_{10}$ is coupled to the input point 51 of the second stage. Since, because of the criss-cross connection between $T_5$ and $T_6$, the collectors of those transistors never rise in potential together, one always remaining at —17 volts, these connections constitute the coupling selector shown as the block 37 in FIG. 1, controlled by the polarity signal supplied from the differential amplifier and shown, on FIG. 1, as carried by the conductor 17.

Figure 4:
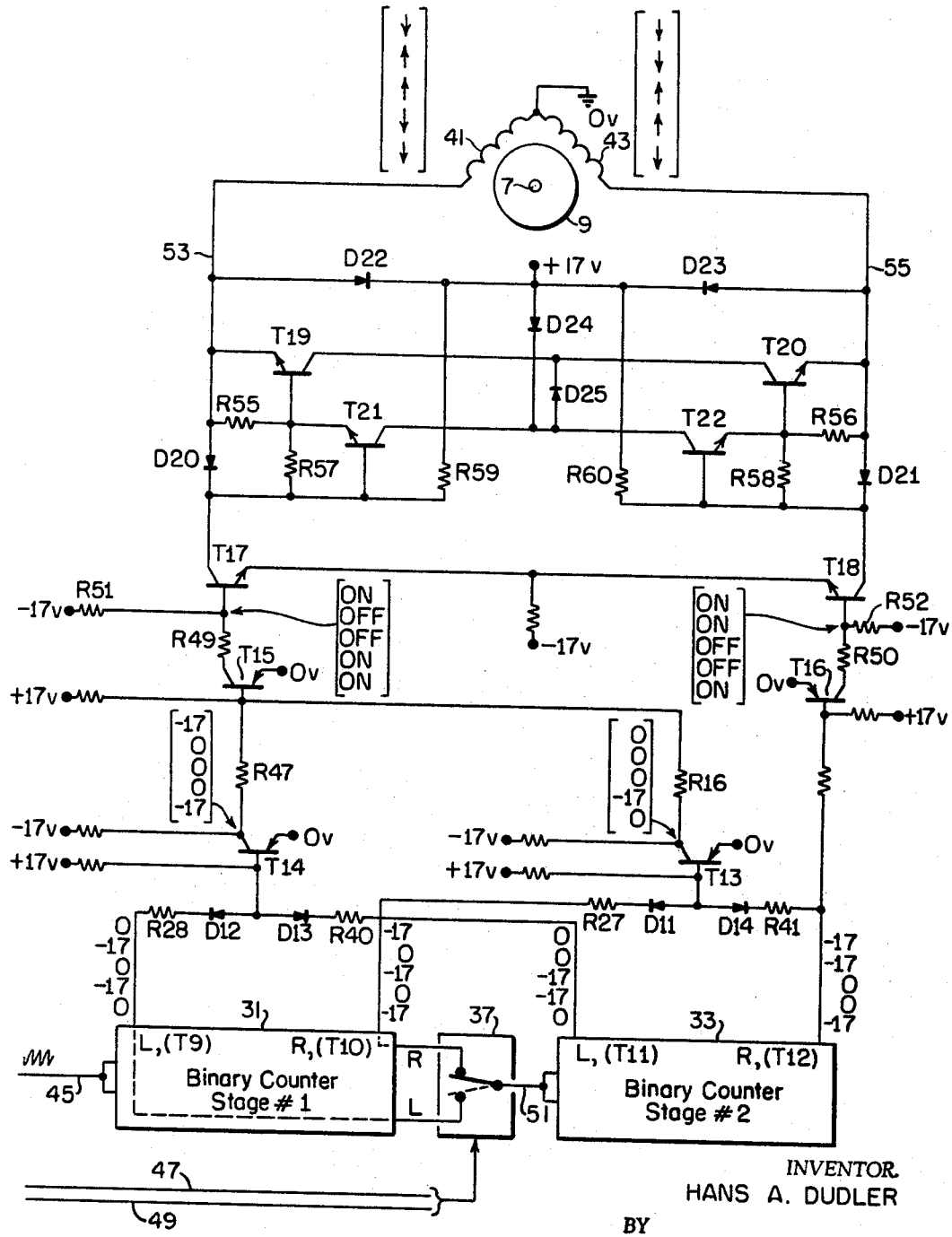
FIG. 4 is a schematic circuit diagram showing a code converter.

FIG. 4 shows the natural binary code counter in block diagram form. It comprises a first flip-flop stage 31 and a second flip-flop stage 33 with a coupling selector 37 interposed between them. This unit determines the counting order, whether it be 0, 1, 2, 3–0, 1, 2, 3, etc., or 0, 3, 2, 1–0, 3, 2, 1, etc. Whether the count be upward or downward, it is modulo four.

The first stage 31 of the binary counter is provided with a left-hand first digit output point (L, $T_9$) and a right-hand first digit output point (R, $T_{10}$). The electrical conditions appearing on these output points, illustratively zero volts or —17 volts, are always complementary as between the left-hand output point and the right-hand output point. Either may be regarded as the principal one, the other being an auxiliary output point. For the sake of definiteness, the left-hand output point will be treated as the principal one. So, too, the second stage of the counter is provided with a left-hand output point (L, $T_{11}$) and a right-hand output point (R, $T_{12}$), on which, again, the electrical conditions are complementary. Because of the structure of the natural binary code, the electrical conditions on the output points of the first stage 31 are interchanged for each input pulse, while the electrical conditions on the output points of the second stage 33 of the counter are interchanged on every other input pulse.

For complete consistency and coherence of the description of the code conversion operation which follows, another convention is specified: Each of the flip-flop stages 31, 33 is regarded as in the OFF state when its right-hand element is cut off; i.e., its collector rests at —17 volts, and as in the ON state when its right-hand element conducts, so that its collector rests at zero potential.

The various conditions which appear, for the consecutive counts zero, one, two, three, zero, on the principal and auxiliary output points of the first and second stages 31, 33, are tabulated on the drawing; and it will be observed that the conditions on the left-hand first and second digit output points are arranged in accordance with the natural binary code. Similarly, the complementary conditions appearing on the right-hand output points are likewise arranged in accordance with the natural binary code.

Above the counter is shown, in schematic form, the circuit (35 of FIG. 1) which accomplishes the conversion from the natural binary code into cyclic binary code in the form of equal and opposite currents suitable for application to the windings 41, 43 of the stepper motor 11.

The electrical coundition s appearing on the principal output terminals of the first and second stages 31, 33 are applied by way of resistors $R_{28}$, $R_{40}$ and diodes $D_{12}$, $D_{13}$ to the base electrode of a transistor $T_{14}$, while the electrical conditions appearing on the complementary output terminals of these two stages are similarly applied by way of resistors $R_{27}$, $R_{41}$ and diodes $D_{11}$, $D_{14}$ to the base electrode of a transistor $T_{13}$. The emitter electrodes of the transistors $T_{13}$, $T_{14}$ are connected to ground, their base electrodes are connected by way of dropping resistors to a source positive potential, for example, $+17$ volts and their collector electrodes are connected by way of dropping resistors to the negative potential bus of $-17$ volts. With these connections, each of the transistors $T_{13}$, $T_{14}$ is cut off when and only when both of the two inputs to its base electrode are at zero volt, and is otherwise conductive. From the logical standpoint, therefore, each of these transistors is a NAND gate. Examination of the different conditions appearing on the two principal ouput leads of the counter shows that the transistor $T_{14}$ is cut off only on the count of zero and conducts on the counts of one, two and three. Similarly, examination of the electrical conditions appearing on the complementary output terminals of the two stages of the counter shows that the transistor $T_{13}$ becomes conductive for all counts except the count of three. The collector electrodes of the transistors $T_{13}$ and $T_{14}$ are connected by way of resistors $R_{46}$, $R_{47}$ to the base electrode of a transistor $T_{15}$ of which the emitter electrode is connected to ground, while the collector electrode is connected through resistors $R_{49}$, $R_{51}$ to the negative potential bus of $-17$ volts and its base electrode is connected through a bias resistor to a point of $+17$ volts potential. Like $T_{13}$ and $T_{14}$, the transistor $T_{15}$ is a logical NAND gate. Examination of the conduction conditions for the transistors $T_{13}$ and $T_{14}$, as thus combined on the base electrode of the transistor $T_{15}$, shows that for the counts zero, one, two, three, zero, it adopts, in succession, the conditions "ON," "OFF," "OFF," "ON," "ON." These last-named conditions are arranged in accordance with the successive values of the first digit of the cyclic code, and accordingly, except for conversion to equal and opposite currents, they are already what is required for energizing one winding of the stator of the stepper motor 11.

The electrical conditions appearing at the principal output terminal of the second stage 33 of the counter are already arranged in accordance with the successive values adopted by the second digit of the cyclic code. The conditions appearing on the auxiliary terminal, being the complements of those on the principal terminal, are likewise arranged in the cyclic code. To balance the amplification of the transistors $T_{14}$ and $T_{13}$, some amplification of these values is required, and this is furnished by a transistor $T_{16}$. Since a single transistor stage connected in the grounded emitter configuration incidentally effects an inversion of polarity, the auxiliary output terminal of the second stage 33 of the counter is selected as a source of conditions for application to the base of the transistor $T_{16}$. Accordingly, the conditions appearing at its collector terminal are, for the counts zero, one, two, three, zero: "ON," "ON," "OFF," "OFF," "ON" as indicated on the figure.

The ON and OFF conditions developed as described above, and appearing at the collector terminals of the transistors $T_{15}$ and $T_{16}$ are applied to the base electrodes of transistors $T_{17}$ and $T_{18}$, respectively. In contrast to the transistors $T_{13}$, $T_{14}$, $T_{15}$ and $T_{16}$ which are of the PNP variety, the transistors $T_{17}$, $T_{18}$ are of the opposite NPN variety, conventionally symbolized by arrowheads that point outward from the semiconductor body. Accordingly, the emitter electrodes of these transistors are connected by way of a bias resistor to the $-17$ volt bus.

The collector electrodes of the transistors $T_{17}$, $T_{18}$ are connected by way of diodes $D_{20}$, $D_{21}$ to the emitter electrodes of transistors $T_{19}$, $T_{20}$, and by way of resistors $R_{55}$–$R_{58}$ to the base electrodes of transistors $T_{19}$–$T_{22}$. The transistors $T_{19}$ and $T_{21}$ are interconnected as a so-called Darlington pair, which provides a convenient configuration for control of transistor gain over a wide range. The transistors $T_{20}$, $T_{22}$ constitute another Darlington pair. The transistors $T_{17}$ and $T_{18}$ and the transistor pairs $T_{19}$–$T_{21}$, $T_{20}$–$T_{22}$ operate as switching transistors. Thus, when the transistor $T_{17}$ is in the "ON" condition, it delivers current in one sense over a conductor 53 to the winding 41 of the stator of the stepper motor 11, and at the same time, turns the transistor pair $T_{19}$–$T_{21}$ OFF. When, to the contrary, the transistor $T_{17}$ is in its "OFF" condition, it ceases to inhibit the action of the transistors $T_{19}$–$T_{21}$ and permits them to be turned on, in which case they become conductive by virtue of the application of a potential of $+17$ volts by way of a diode $D_{24}$ to the collector of the transistor $T_{21}$ and by way of this diode and a second diode $D_{25}$ to the collector of the transistor $T_{19}$. When the transistor pair $T_{19}$–$T_{21}$ becomes conductive, current flows through the left-hand winding 41 of the stator of the stepper motor 11, but in the opposite sense to that in which it flows due to conduction of the transistor $T_{17}$. Provided the strength of the current is sufficient to accomplish the stepping in each case, it is not of significance whether or not the currents, in the two senses be of exactly the same magnitudes. Nevertheless, for the greatest evenness of the stepping action, it is desirable that the reversals of the sense of the current in each winding be accomplished without great change in its magnitude. By virtue of the high current gain provided by the Darlington configuration a relatively small current into the base of $T_{21}$ (through resistor $R_{59}$) is sufficient to render both, $T_{21}$ and $T_{19}$ heavily conductive. Thus in the conductive state the voltage drop between the collector of $T_{21}$ and the emitter of $T_{19}$ is negligible and the action of transistors $T_{19}$ and $T_{21}$ is similar to that of a switch. Since the magnitudes of the positive and negative supply voltages are practically identical this ensures evenness of current in the motor windings regardless of polarity.

Identical connections and identical behavior of the transistors $T_{18}$, $T_{20}$ and $T_{22}$ supply currents of opposite senses and substantially like magnitudes by way of a conductor 55 to the winding 43 of the stator of the stepper motor 11.

Most important, from examination of the tabulated ON and OFF values for the transistors $T_{15}$ and $T_{16}$, it is apparent that the reversal of the current in each winding takes place once for every second pulse input to the binary counter and that the reversals in the two windings take place in alternation. That is to say, the stator windings are respectively fed by two-valued positive-negative currents arranged in accordance with the first and second digits, respectively, of the cyclic code. These currents, their reversals and the alternations between them, are indicated by bracketed arrows alongside the windings 41, 43.

It is important for the proper stepping action of the motor 11 that there be neither overlap of the positive current in a motor winding with negative current in the same winding nor underlap between them. Underlap would result in a dead space or zero current condition between positive current flow and negative current flow. If this were to coincide with a like underlap in the case of the currents in the other winding, the magnetic field in the rotor space would vanish, and the rotor would be free to turn. If it were to appear in only one of the windings, the other being properly energized, the result would be that the magnetic field vector would adopt an orientation half way between two successive proper orientations. Overlap would seriously reduce the strength of the magnetic field and, in addition, would make for simultaneous current flow through the transistors $T_{17}$ and $T_{19}$, or $T_{16}$ and $T_{20}$ and so would cause each of these transistors to act as a short circuit for the other.

The circuit shown prevents both overlap and underlap and causes the forward winding current to start flowing through the stator winding 41 or 43 at exactly the voltage point at which the reverse current ceases, and vice versa. The circuit thus resembles, in its behavior, a reversing switch. That it does so will be seen from the following considerations.

Because of the negative biases applied to its base and its emitter and the voltage drop across the resistors $R_{59}$, when the transistor $T_{17}$ conducts, its collector rests at a negative potential. Hence current represented by one of the downward pointing arrows in the bracket alongside of the winding 41 flows from ground, through the diode $D_{20}$, and into the collector of $T_{17}$. At the same time, the negative potential of the collector holds the diode $D_{20}$ in its forward condition and holds the Darlington pair, $T_{19}$–$T_{21}$ OFF. When, to the contrary, the transistor $T_{17}$ is cut off, the potential of its collector rises toward the +17 volt level, and, as it rises, the Darlington pair are turned ON. This compound transistor $T_{19}$–$T_{21}$ now behaves as an emitter-follower, with the winding 41 as its load, and current represented by one of the upward pointing arrows in the bracket flows from the emitter of $T_{19}$ through the winding 41 and to ground. The absence of load current flow through diode $D_{20}$ removes the reverse bias from the base-emitter junctions of transistors $T_{19}$ and $T_{21}$ and a positive bias current flowing through resistor $R_{59}$ acts to turn the transistor pair $T_{19}$–$T_{21}$ ON at the intsant that $T_{17}$ turns OFF, and so prevents underlap of the transistor currents. Moreover, any tendency toward overlap would be accompanied by reversal of the voltage across this diode, in which case its high reverse resistance would block the undesired current flow from $T_{17}$ into the winding 41. In this way, it also prevents overlap.

Various departures from and modifications of the details of the embodiment shown and described above will suggest themselves to those skilled in the art.

The invention having now been described, what is claimed is:

1. In combination with means for generating a command voltage and a stepper-motor having a first and a second orthogonally disposed stator winding for developing a resultant magnetic field in a direction dependent on the magnitudes and senses of currents flowing in said windings and a rotor proportioned to adopt an angular position in which one of its axes is parallel to said field, apparatus for causing angular movements of said rotor to follow changes of said command voltage which comprises means coupled to the shaft of the rotor for generating a feedback voltage monotonically related to the angular displacement of said rotor, a differential amplifier proportioned to deliver a first signal indicative of the magnitude of the difference between said command and feedback voltages and a second signal indicative of its sense, a reversible pulse counter having a first and a second output terminal and proportioned to deliver at said terminals two-valued first and second digit electrical conditions that are representative in the cyclic binary code of the number of pulses counted modulo four, means under control of said first signal for delivering a train of pulses to said counter, thereby to advance said count in one order, means under control of said second signal for reversing the order of said advance, means for causing equal and opposite currents to flow in said first stator winding in response to the two first digit electrical conditions, and means for causing equal and opposite currents to flow in the second stator winding in response to the two second digit electrical conditions.

2. Apparatus as defined in claim 1 wherein said pulse train delivering means comprises an energy store, means for charging said store at a rate dependent on the magnitude of said first signal, means operative when the stored energy has reached a preassigned magnitude for abruptly discharging said store, and means for deriving a pulse from each such discharge.

3. In combination with apparatus as defined in claim 1, means for establishing first and second thresholds, means for inhibiting the delivery of pulses in response to first signals of magnitudes below said first threshold, means for restricting said first signals to magnitudes not greater than said second threshold, and means for increasing the rate of pulse delivery conformably with increases of the magnitude of a first signal from said first threshold to said second threshold.

4. In combination with apparatus as defined in claim 3, means operative for first signals of magnitudes intermediate between said thresholds for controlling the rate of charge of said store in proportion to the excess of the magnitude of said first signal above said first threshold.

5. Apparatus as defined in claim 1 wherein said differential amplifier comprises a first and a second transistor, a first resistor interconnecting the collector of the first transistor with a fixed potential point, a second resistor interconnecting the collector of the second transistor with said fixed potential point, the base of each transistor being cross-coupled to the emitter of the other transistor, and input connections extending from the command voltage generating means to the base of one of the two transistors and from the feedback voltage generating means to the other of the two transistors, respectively, whereby a deviation in one sense between said feedback and said command voltage is manifested as a voltage drop across one of said resistors and a deviation in the opposite sense between said feedback and said command voltage is manifested as a voltage drop across the other one of said resistors.

6. In combination with apparatus as defined in claim 5, a first unidirectionally conducting device interconnecting the collector of the first transistor with a common point and poled for forward conduction from the collector to the point, and a second unidirectionally conducting device interconnecting the collector of the second transistor with said common point and poled for forward conduction from the last-named collector to said point, whereby current flow from either collector to said point is inhibited until that collector has reached a potential in excess of the potential of said point.

7. In combination with apparatus as defined in claim 6, a relaxation oscillator proportioned to deliver a train of pulses at a controllable rate, a resistor and a unidirectionally conducting device interconnecting said common point with a point of fixed potential, said device being poled for forward conduction from said common point to said fixed potential point, whereby current flows from one of said collectors to the fixed potential, said device being poled for forward collector exceeds the fixed potential, and means for utilizing the voltage drop across said resistor for governing the rate of pulse delivery by said relaxation oscillator.

8. In combination with apparatus as defined in claim 7, a Zener diode having its anode connected to the fixed potential point and its cathode connected to the common point, whereby the breakdown potential of said Zener diode establishes a threshold above which the collector potential of neither of said transistors can increase.

9. In combination with apparatus as defined in claim 6, a relaxation oscillator comprising a capacitor of which one terminal is connected to the first fixed potential point, means for charging said capacitor at a controllable rate, said rate control means comprising
    a transistor of which the collector is connected to the other terminal of said capacitor and of which the base is connected to the second fixed potential point,
    and an adjustable resistor interconnecting the emitter of said transistor with said common point.

10. In combination with a stepper motor having two orthogonally disposed windings and a rotor, means for advancing said rotor angularly by equal abrupt steps in a preassigned direction which comprises a binary counter of two stages,
    the first stage having a principal output point on which appear, consecutively and in response to a train of input pulses, the states: OFF, ON, OFF, ON, OFF . . . and an auxiliary output point on which appear the complements of said states,
    the second stage having a principal output point on which appear, consecutively and in response to output pulses from the first stage, the states: OFF, OFF, ON, ON, OFF . . . and an auxiliary output point on which appear the complements of said last-named states, means for grouping the states appearing on the two principal output points to form a first intermediate signal which adopts the states: OFF, ON, ON, ON, OFF . . . , means for grouping the states appearing on the two auxiliary output points to form a second intermediate signal which adopts the states: ON, ON, ON, OFF, ON . . . , means for combining said first and second intermediate signals to form a control signal which adopts the states: ON, OFF, OFF, ON, ON . . . , means for developing positive and negative currents to correspond to the ON states and the OFF states, respectively, of said control signal, means for supplying one of said windings with said currents, and means for simultaneously supplying the other of said windings with positive and negative currents that correspond, respectively, to the ON and OFF states of the second stage of said counter.

11. In combination with a stepping motor having two orthogonally disposed windings and a rotor, means for advancing said rotor angularly by equal abrupt steps in a preassigned direction which comprises a two-stage binary counter constructed to deliver, in response to a train of driving pulses, a succession of four different states representative in the conventional binary code of a count of said pulses modulo four,
    the first stage having a first digit principal output point on which the electric condition alternates between two values for every driving pulse,
    the second stage having a second digit principal output point on which the electrical condition alternates between two values for every other driving pulse, said conditions being thus representative of the number, modulo four, of driving pulses in the natural binary code, means for converting said digit conditions into other conditions representative of the same pulse count in the cyclic code which comprises a first digit auxiliary output point connected to the first stage in a fashion to carry an electrical condition that is at all times complementary to the condition appearing on the first digit principal output point, a second digit auxiliary output point connected to the second stage in a fashion to carry an electrical condition that is at all times complementary to the condition appearing on the second digit principal output point, a first NAND gate having two input points and an output point, connections extending from the first and second digit principal output points to the several input points of said first NAND gate, a second NAND gate having two input points and an output point, connections extending from the first and second digit auxiliary output points to the several input points of the second NAND gate, a third NAND gate having two input points and an output point, connections extending from the output points of the first and second NAND gates to the several input points of the third NAND gate, means for converting each condition of a first kind appearing at the output point of the third NAND gate into an electric current of one polarity, means for converting each condition of another kind appearing at the output point of the third NAND gate into an electric current of opposite polarity, means for suppling one of said orthogonal windings with said currents, and means for simultaneously supplying the other of said orthogonal windings with currents of which the polarity reversals coincide with the changes of state of the second stage of said counter.

12. In combination with a stepper motor having a first and a second orthogonally disposed windings and a rotor, means for supplying said windings with currents to cause step-by-step advance of the angular position of said rotor which comprises a first conductor, means for developing on said first conductor a first sequence of ON-OFF electrical conditions, a second conductor, means for developing on said second conductor a second sequence of ON-OFF electrical conditions, said first and second sequences being respectively conformable with the first and second digits of a number of pulses counted, modulo four, in the cyclic binary code, a first and a second transistor of like conductivity types, the collector of the first transistor and the emitter of the second transistor being connected to a common point, biasing means for the emitter of the first transistor and the collector of the second transistor, connections through which current flowing in the collector of the first transistor cuts off the second transistor and through which a cut-off condition of the first transistor renders the second transistor conductive, means for applying the first digit electrical conditions as control signals to the base of the first transistor, a current path extending from said common point to the first of said windings, two similar transistors, similarly connected together and to a second common point, a current path extending from the second common point to the second winding, and means for applying the second digit electrical conditions as control signals to the base electrode of one of said two last-named transistors.

References Cited

UNITED STATES PATENTS

| | | |
|---|---|---|
| 3,239,736 | 3/1966 | Gardberg. |
| 3,241,017 | 3/1966 | Madsen et al. _____ 318—138 |
| 3,247,433 | 4/1966 | Lasch et al. _____ 318—138 |
| 3,297,927 | 1/1967 | Blakeslee et al. _____ 318—138 |
| 3,304,480 | 2/1967 | Ko _____ 318—138 |
| 3,328,658 | 6/1967 | Thompson _____ 318—138 |

ORIS L. RADER, *Primary Examiner.*

G. SIMMONS, *Assistant Examiner.*

U.S. Cl. X.R.

318—138, 28, 29, 448

UNITED STATES PATENT OFFICE
CERTIFICATE OF CORRECTION

Patent No. 3,418,547                        December 24, 1968

Hans A. Dudler

It is certified that error appears in the above identified patent and that said Letters Patent are hereby corrected as shown below:

Column 21, line 74, "said device being poled for forward" should read -- point only when the potential of that --.

Signed and sealed this 10th day of March 1970.

(SEAL)
Attest:

Edward M. Fletcher, Jr.
Attesting Officer

WILLIAM E. SCHUYLER, JR.
Commissioner of Patents